US010944650B2

(12) United States Patent
Shanbhag et al.

(10) Patent No.: US 10,944,650 B2
(45) Date of Patent: Mar. 9, 2021

(54) PROGRAMMABLE, POLICY-BASED EFFICIENT WIRELESS SNIFFING NETWORKS IN WIPS (WIRELESS INTRUSION PREVENTION SYSTEMS)

(71) Applicant: Fortinet, Inc., Sunnyvale, CA (US)

(72) Inventors: Pramod Shanbhag, Bangalore (IN); Lakshmi Narayana Dronadula, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 256 days.

(21) Appl. No.: 15/939,634

(22) Filed: Mar. 29, 2018

(65) Prior Publication Data

US 2019/0306034 A1 Oct. 3, 2019

(51) Int. Cl.
*H04L 12/26* (2006.01)
*H04L 29/06* (2006.01)
*H04W 12/08* (2021.01)

(52) U.S. Cl.
CPC ............ *H04L 43/028* (2013.01); *H04L 43/12* (2013.01); *H04L 43/18* (2013.01); *H04L 63/1416* (2013.01); *H04L 63/1425* (2013.01); *H04W 12/08* (2013.01)

(58) Field of Classification Search
CPC ............... H04L 43/028; H04L 63/1425; H04L 63/1416; H04L 43/18; H04L 43/12; H04L 41/0893; H04L 63/1408; H04L 63/20; H04L 41/5003; H04L 43/062; H04W 12/08; H04W 12/005; H04W 12/1204
See application file for complete search history.

(56) References Cited

U.S. PATENT DOCUMENTS

| | | | | |
|---|---|---|---|---|
| 8,213,444 B1* | 7/2012 | Harris | ................. | H04L 49/9005 370/412 |
| 8,264,978 B1* | 9/2012 | Srinivas | ................ | H04L 43/028 370/252 |
| 8,612,612 B1* | 12/2013 | Dukes | ................... | H04L 67/141 709/228 |
| 9,307,441 B1* | 4/2016 | Vivanco | ............ | H04W 28/0231 |
| 2005/0248457 A1* | 11/2005 | Himberger | ............ | G06F 21/552 340/541 |
| 2006/0126509 A1* | 6/2006 | Abi-Nassif | ............. | H04L 47/10 370/235 |

(Continued)

*Primary Examiner* — Aravind K Moorthy
(74) *Attorney, Agent, or Firm* — Law Office Of Dorian Cartwright; Dorian Cartwright

(57) ABSTRACT

A plurality of sniffing policies describing deep packet inspection processes performed on network traffic at sniffing access points from the plurality of access points is received. Network traffic levels are monitored at the plurality of access points and a level of sniffed traffic backhauled over the Wi-Fi network for analysis. A change can be detected in network traffic affecting a sniffing policy. Responsive to exceeding a certain level of sniffed traffic being backhauled, an amount of sniffed traffic sent upstream for analysis is adjusted. More specifically, a programmable policy engine at each of a sniffing access points serving as intrusion detection sensors to sniff traffic at various locations on the Wi-Fi network are reprogrammed dynamically. The adjustments reprogram a sniffing pipeline at each of the intrusion detection sensors including adjusting an endpoint device for sending sniffed traffic and dropping more traffic during deep packet inspection.

6 Claims, 5 Drawing Sheets

(56) References Cited

U.S. PATENT DOCUMENTS

| | | | |
|---|---|---|---|
| 2006/0153233 A1* | 7/2006 | Chen | H04L 47/10 370/468 |
| 2006/0190609 A1* | 8/2006 | Chetuparambil | H04L 69/16 709/228 |
| 2006/0233110 A1* | 10/2006 | Yang | H04W 28/12 370/237 |
| 2010/0188975 A1* | 7/2010 | Raleigh | H04M 15/61 370/230.1 |
| 2010/0287227 A1* | 11/2010 | Goel | H04L 67/1002 709/202 |
| 2011/0205916 A1* | 8/2011 | Dinan | H04L 43/028 370/252 |
| 2012/0089845 A1* | 4/2012 | Raleigh | H04L 41/5045 713/176 |
| 2012/0140620 A1* | 6/2012 | Hogan | H04L 41/147 370/230 |
| 2012/0203926 A1* | 8/2012 | Camp | H04L 29/1282 709/238 |
| 2013/0227689 A1* | 8/2013 | Pietrowicz | H04L 41/12 726/23 |
| 2013/0272144 A1* | 10/2013 | Dong | H04W 24/10 370/252 |
| 2014/0157405 A1* | 6/2014 | Joll | H04L 63/1425 726/22 |
| 2014/0171089 A1* | 6/2014 | Janakiraman | H04L 63/0892 455/445 |
| 2014/0198687 A1* | 7/2014 | Raleigh | G06Q 40/00 370/259 |
| 2015/0092576 A1* | 4/2015 | Vaidya | H04L 47/11 370/252 |
| 2015/0327140 A1* | 11/2015 | Eriksson | H04W 28/0247 455/438 |
| 2016/0094573 A1* | 3/2016 | Sood | H04L 63/0428 713/156 |
| 2016/0277284 A1* | 9/2016 | Callard | H04L 1/0075 |
| 2017/0142068 A1* | 5/2017 | Devarajan | H04L 43/028 |
| 2017/0223049 A1* | 8/2017 | Kuperman | H04L 63/1466 |
| 2017/0295103 A1* | 10/2017 | Starsinic | H04W 28/18 |
| 2017/0299633 A1* | 10/2017 | Pietrowicz | H04L 43/028 |
| 2017/0303165 A1* | 10/2017 | Adams | H04L 43/16 |
| 2018/0006954 A1* | 1/2018 | Arora | H04L 47/20 |
| 2018/0014234 A1* | 1/2018 | Graffagnino | H04W 76/36 |
| 2018/0063848 A1* | 3/2018 | Ashrafi | H04W 24/04 |
| 2018/0103392 A1* | 4/2018 | Emmanuel | H04W 72/082 |
| 2018/0176920 A1* | 6/2018 | Dong | H04W 72/10 |
| 2018/0227244 A1* | 8/2018 | Zhang | H04L 47/827 |
| 2018/0234346 A1* | 8/2018 | Liu | H04L 43/10 |
| 2018/0337858 A1* | 11/2018 | Yang | H04L 47/12 |
| 2018/0359279 A1* | 12/2018 | Knight | H04L 63/1458 |
| 2019/0069187 A1* | 2/2019 | Ashrafi | H04L 41/5054 |
| 2019/0081981 A1* | 3/2019 | Bansal | H04L 63/20 |
| 2019/0124010 A1* | 4/2019 | Murgia | H04L 67/322 |
| 2019/0149518 A1* | 5/2019 | Sevinc | H04L 63/0263 726/11 |
| 2019/0268232 A1* | 8/2019 | Garcia Azorero | H04M 15/66 |
| 2019/0379551 A1* | 12/2019 | Prasad | H04L 12/189 |

* cited by examiner

PROGRAMMABLE, POLICY-BASED EFFICIENT WIRELESS SNIFFING NETWORKS IN WIPS (WIRELESS INTRUSION PREVENTION SYSTEMS)

FIELD OF THE INVENTION

The invention relates generally to computer networking improvements, and more specifically, to provide dynamically adjusting sniffing pipelines when using access points as intrusion detection sensors.

BACKGROUND

Wireless sniffing on a data communication network is a way of capturing all packets within radio range for intrusion detection analysis. A copy of the sniffed packets is then backhauled to a centralized server for analysis by an intrusion detection server or anomaly detection server.

One problem with deploying WIPS as an embedded system is the traffic overhead. Centralized solutions present tremendous problems as the volume of traffic increases (and decreases) as extra copies of packets consume network bandwidth. Further, powerful computing resources are needed to run complex algorithms for detecting intrusions and raising alerts accordingly.

One solution is to deploy WIPS (wireless intrusion prevention systems) as a separate backhaul overlaid on top of the communication system. This solution reduces traffic on the communication system and has dedicated hardware, but can be prohibitively expensive and out of reach for smaller entities. Another solution is to deploy WIPS embedded within Therefore, what is needed is a robust technique to provide a dynamic and scalable sniffing sensor system that can adjust the levels and routing of sniffing traffic as network conditions change.

SUMMARY

These shortcomings are addressed by the present disclosure of methods, computer program products, and systems for deploying sniffing policies in embedded access point sensors.

In one embodiment, a plurality of sniffing policies describing deep packet inspection processes performed on network traffic at sniffing access points from the plurality of access points is received. Network traffic levels are monitored at the plurality of access points and a level of sniffed traffic backhauled over the Wi-Fi network for analysis.

In another embodiment, a change can be detected in network traffic affecting a sniffing policy. Responsive to exceeding a certain level of sniffed traffic being backhauled, an amount of sniffed traffic sent upstream for analysis is adjusted. More specifically, a programmable policy engine at each of a sniffing access points serving as intrusion detection sensors to sniff traffic at various locations on the Wi-Fi network are reprogrammed dynamically. The adjustments reprogram a sniffing pipeline at each of the intrusion detection sensors including adjusting an endpoint device for sending sniffed traffic and dropping more traffic during deep packet inspection.

Advantageously, network performance is improved by reducing network traffic from intrusion detection processes.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for deploying sniffing policies in embedded access point sensors. One of ordinary skill in the art will recognize that many other scenarios are possible, given the present disclosure, as discussed in more detail below.

Dynamic Sniffing System (FIGS. 1-4)

Figure 1:
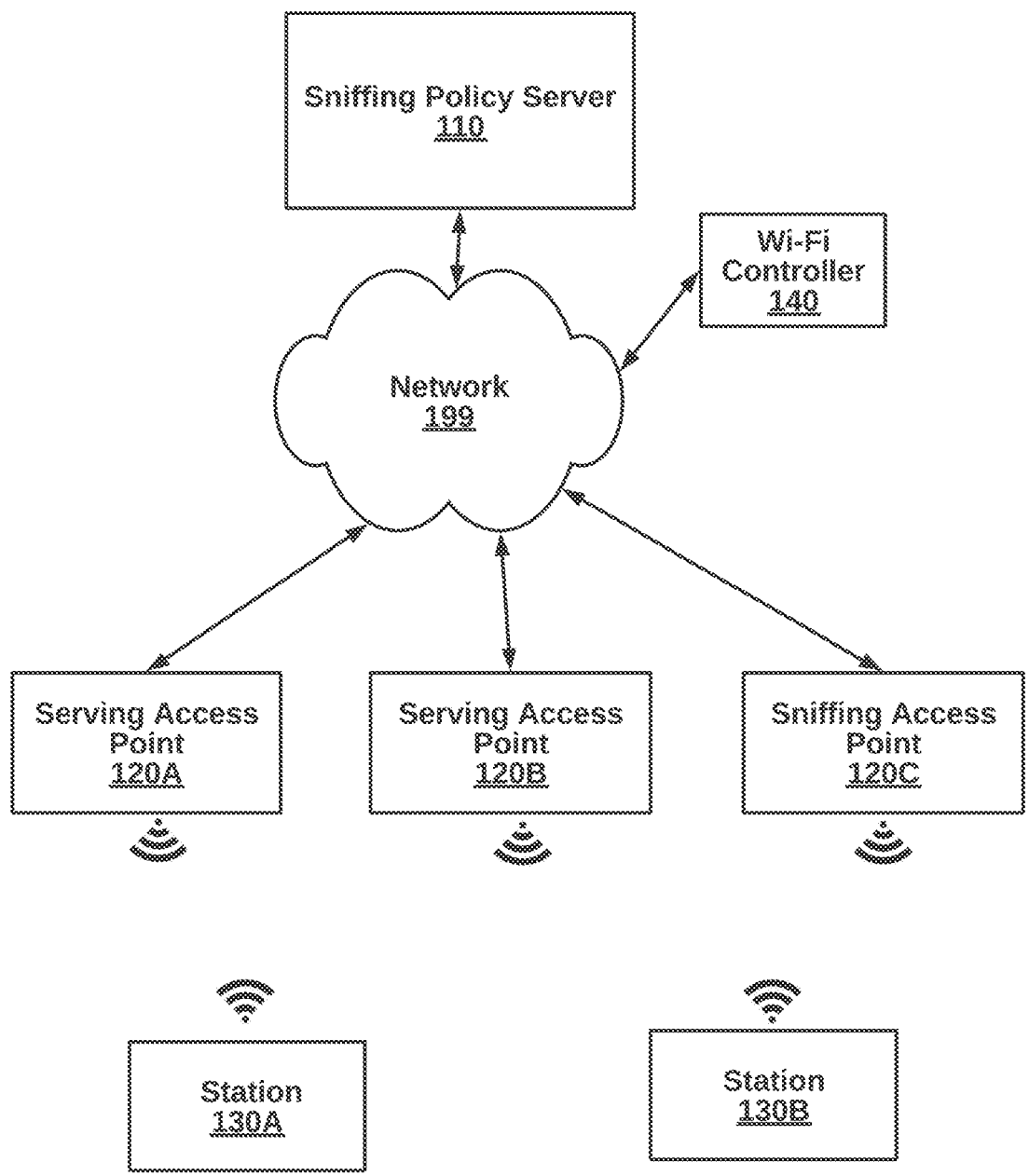
FIG. 1 is a high-level block diagram illustrating a system to deploy sniffing policies in embedded access point sensors, according to one embodiment.

FIG. 1 is a high-level block diagram illustrating a system 100 to deploy sniffing policies in embedded access point sensors, according to one embodiment. The system 100 comprises a sniffing policy server 110, access points 120A-C, stations 130A-B, and Wi-Fi controller 140. Many other configurations are possible. For example, additional network components can also be part of the system 100, such as firewalls, virus scanners, routers, switches, application servers, databases, and the like.

Network 199 provides a data channel for components of the system 100 with network devices, such as routers, switches, network processors, and the like. The components can use data channel protocols, such as IEEE 802.11n, 802.11ac, or other versions of the 802.11 and other wireless standards. Referring specifically to FIG. 1, the sniffing policy server 110 is coupled across the network 199 to each of the of access points 120A-C, preferably over wired connections. In, turn, the access points 120A-C are coupled to the stations 130A-B, preferably over wireless connections.

The sniffing policy server 110 adjusts sniffing levels of sensors to manage overall network traffic. A level of organic network traffic is tracked along with a level of sniff traffic created for intrusion detection.

The sniffing policy server 110 location of FIG. 1 is located within a LAN or remotely on the Internet cloud. When implemented within a LAN, the central locationing server 110 can be further integrated within the Wi-Fi controller 140, or have a dedicated line of communication. The sniffing policy server 110 is set forth in more detail below with respect to FIG. 2.

The access points 120A can operate conventionally or as sensors. In FIG. 1, at a snapshot in time, access point 120C is operating as a sniffing access point, and access points 120A,B are operating as serving access points. As such, sniffing access point 120C listens to all traffic within radio range and determines which packets to drop, which to locally process for intrusion detection, which to send upstream to the sniffing policy server 110, or other locations. In one embodiment, a serving access point can convert on the fly to ta sniffing access point, and vice versa. Moreover, an access point can have two radios, with one radio operating as a serving radio and one radio operating as a sniffing radio.

Figure 6:
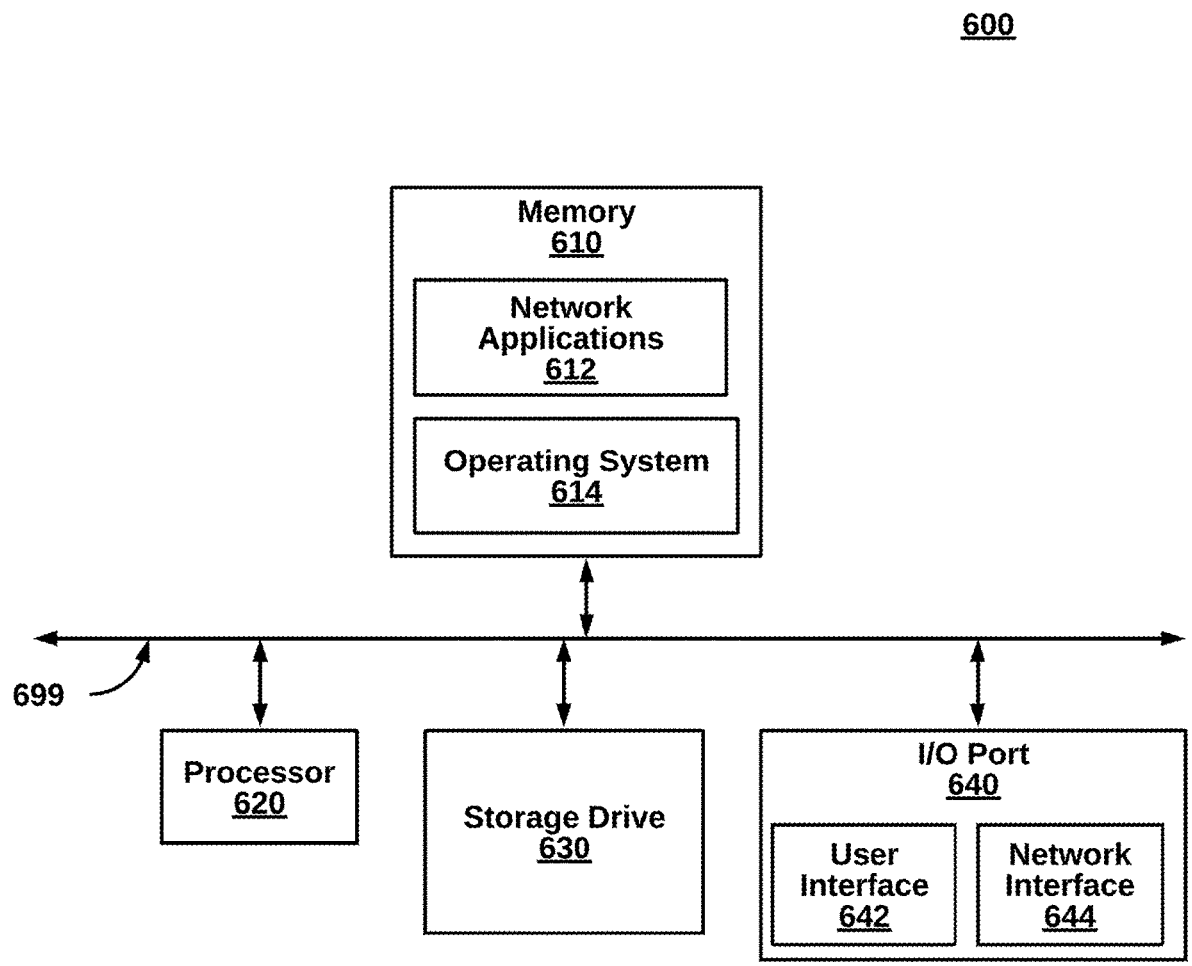
FIG. 6 is a block diagram illustrating an example computing device, according to one embodiment.

The access points 120A,B physically include one or more individual access points implemented in any of the computing devices discussed herein (e.g., see FIG. 6). For example, the access points 120A,B can be an AP 110 or AP 433 (modified as discussed herein) by Fortinet of Sunnyvale, Calif. A network administrator can strategically place the access points 120A,B for optimal coverage area over a locale. The access points 120A,B can, in turn, be connected to a wired hub, switch or router connected to the enterprise network 199 (or an external network). In embodiment, access point functionality is incorporated into a switch or router. In another embodiment, the access points 120A,B are virtual devices. Further embodiments of the sniffing access point 120C is discussed with respect to FIG. 3.

Stations 130A-B exchange network traffic over a Wi-Fi portion of the network with access points. Additionally, the stations 130A-B of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7).

The Wi-Fi controller 140 manages the access points 120A,B and controls stations as they traverse around the network.

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7).

Figure 2:
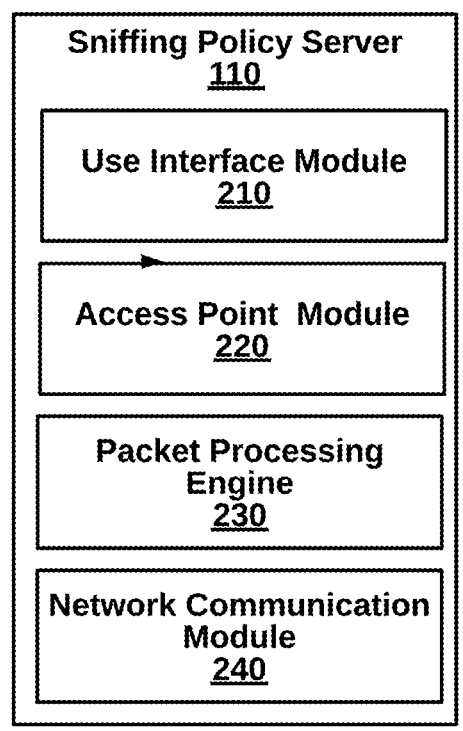
FIG. 2 are more detailed block diagrams illustrating internal components of a sniffing policy server from the system of FIG. 1, according to some embodiments.

FIG. 2 is a more detailed block diagram illustrating the sniffing policy server 110 of the system 100, according to one embodiment. The sniffing policy server 110 comprises user interface module 210, access point module 220, packet processing engine 230, and a network communication module 240.

User interface module 210 can be, for example, a graphical user interface, a command line interface, or any other mechanism for providing user input and output to the central locationing server 110. User policies can be created and updated through user accounts and stored in the QoS policies database 260. Internet browsers or downloadable apps can abstract communication for users and/or network administrators. User devices can be physically connected by a serial port or radio connected over a local Wi-Fi LAN. User devices can alternatively be remotely connected to the user interface module 210 over the Internet or by VPN (virtual private network).

Access point module 220 manages high level communications with access points and programmable policy engines locate thereon. For example, commands based on a sniffing policy are sent to increase or decrease levels of scrutiny at different points along DPI pipeline at an access point.

Packet processing engine 230 can be a DPI, network processor, or other processing engine. Beyond just the headers, content of packets can be scrutinized, and the content of several packets can be analyzed together in order to discover and react to higher layer application communications.

Network communication module 240 includes APIs, networking software and hardware ports and protocols, and radios needed to communicate with access points, stations, external databases and severs, and the like.

Figures 3, 4:
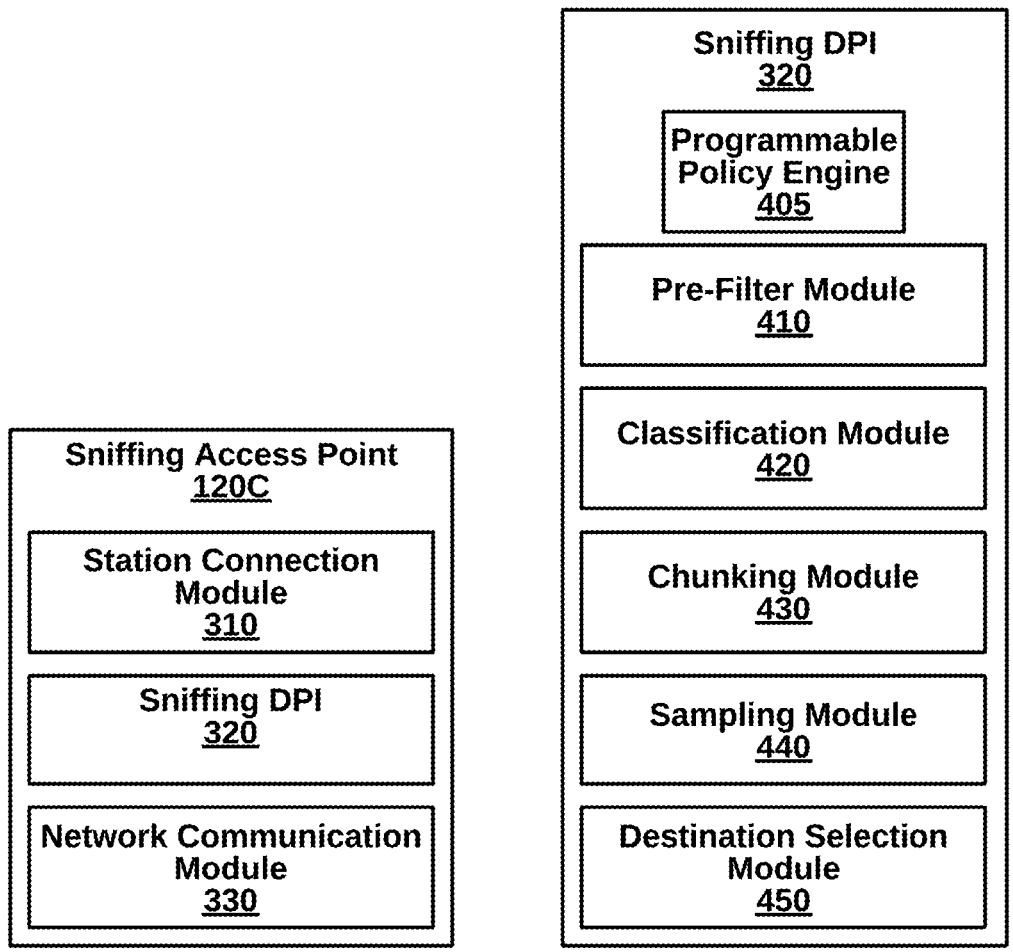
FIG. 3 is a more detailed block diagram illustrating internal components of a sniffing access point from the system of FIG. 1, according to one embodiment.
FIG. 4 is a more detailed block diagram illustrating internal components of a sniffing DPI from the sniffing access point of FIG. 3, according to one embodiment.

FIG. 3 is a more detailed block diagram illustrating a sniffing access point 120C of the system 100, according to one embodiment. The access point 120 comprises a station connection module 310, a sniffing DPI 320, and a network communication module 330. The internal components can be implemented in hardware, software, or a combination of both.

The station connection module 310 may not actively send out beacons and associate with stations, but nearby stations can be tracked and characterized. The sniffing DPI 320 is preferably a powerful processor relative to those at the access point. The network communication module 330 handles protocols and connection interfaces to communication channels.

FIG. 4 is a more detailed block diagram of a sniffing DPI 320. The sniffing DPI 320 includes a pre-filter module 410 to drop benign packets, for example, from known or white list hosts or MACS. A classification module 420 classifies network traffic and forwards certain classes for further processing upstream. A chunking module 430 forwards only a part of a packet, such as a header, a field value, or a data field. A sampling module 440 forwards only certain types of traffic (e.g., UDP, TCP, instant messenger). A destination selection module 450 sends to a preconfigured destination, based on conditions such as traffic load, type of packet, time of day, network congestion, and the like.

Figure 5:
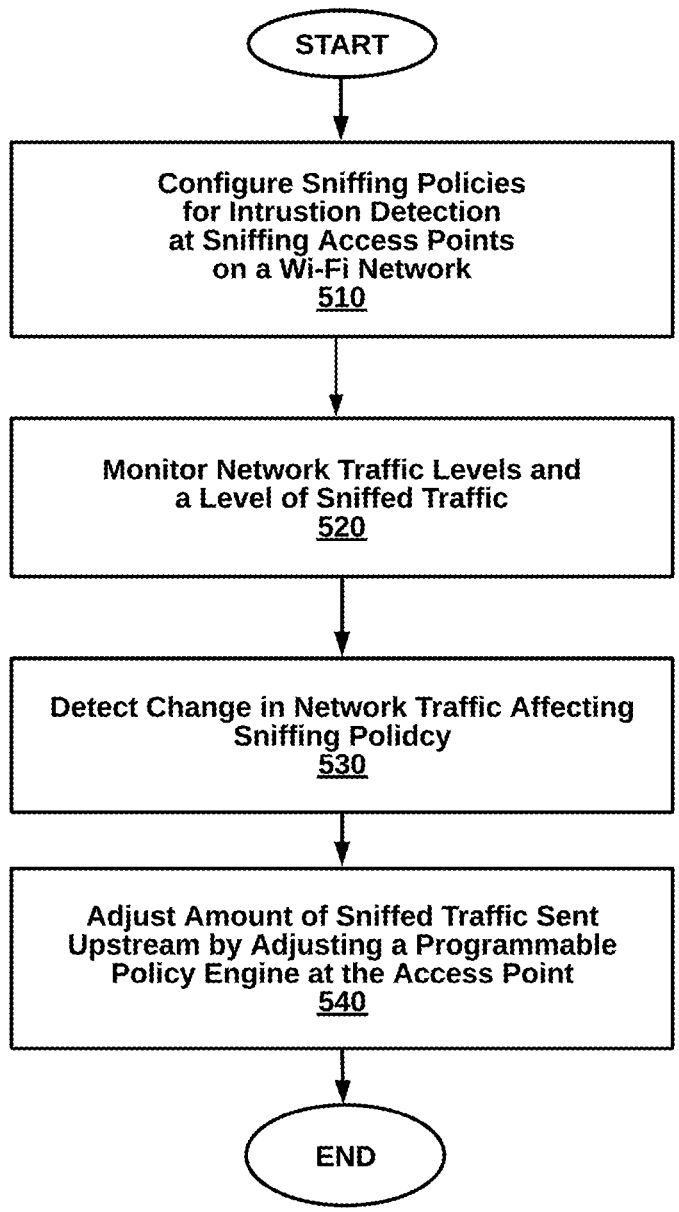
FIG. 5 is a high-level flow diagram illustrating a method for deploying sniffing policies in embedded access point sensors, according to one embodiment.

Methods for Dynamic Sniffing (FIG. 5)

FIG. 5 is a high-level flow diagram illustrating a method 400 for centrally controlling locationing for beamforming Wi-Fi transmissions to wireless stations from access points independent of beamforming capability of stations, according to one embodiment. The method 400 can be implemented by the system 100 of FIG. 1 or a different system. One of ordinary skill in the art will recognize that the method 400 is non-limiting as other embodiments can have more or less steps and can be performed in a different order.

At step 405, QoS settings for users are configured. Alternatively, of in combination with specific QoS settings, general QoS network policies can be configured. The QoS settings can be based on a service level, a subscription, a rank in an entity (e.g., CEO or CTO), or distance from an access point. For example, a nearby station will have a higher SNR due to the distance and does not need enhanced signaling of beamforming transmissions, especially if other devices do.

At step 410 communication channels are established with a plurality of access points over a data communication network. The access points, in turn, have communication channels established with a plurality of stations over a Wi-Fi portion of the data communication network.

At step 420, locationing for QoS beamforming is centrally controlled from a central locationing server. A control layer is established for beamforming locationing and the control layer provides beamforming according to a QoS of the user or the user device. The beamforming locationing determined by the network supplants any IEEE 802.11ac related locationing information, and in fact, has no reliance on this data in some embodiments. Further embodiments of the centrally controlling step 420 are discussed in FIG. 5.

At step 430, network packets are transmitted from access points with beamforming signals to stations. The transmissions are based on beamforming locationing information and are independent of beamforming capability, as described further in association in FIG. 6 below.

FIG. 5 is a high-level flow diagram illustrating a method 500 for deploying sniffing policies in embedded access point sensors, according to one embodiment. The method can be performed in a different order or have different grouping at each step.

At step 510, sniffing policies are configured for intrusion detection at sniffing access points. At step 520, network traffic levels and a level of sniffed traffic are monitored. At step 530, a change in network traffic affecting sniffing policy is detected. At step 540, an amount of sniffed traffic sent upstream is adjusted by adjusting a programmable policy engine at an access point, as described herein.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the central log manager 110, the collector nodes 120, and the network devices 130A-D. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the sniffing policy server 110, the access points 120A-C, and the stations 130A,B, as illustrated in FIGS. 1-3. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for a WIPS (wireless intrusion prevention system) server implemented at least partially in hardware and communicatively coupled to a plurality of access points which are in turn communicatively coupled to a plurality of wireless stations on a Wi-Fi portion of a data communication network, the method for deploying sniffing policies in embedded access point sensors, the method comprising the steps of:

receiving a plurality of sniffing policies describing deep packet inspection processes performed on network traffic at sniffing access points from the plurality of access points;

monitoring a level network traffic at the plurality of access points and a level of sniffed traffic backhauled over the Wi-Fi network for analysis;

detecting a change in network traffic affecting a sniffing policy; and responsive to exceeding a certain level of sniffed traffic being backhauled, adjusting an amount of sniffed traffic sent upstream for analysis by reprogramming a programmable policy engine at each of a sniffing access points serving as intrusion detection sensors to sniff traffic at various locations on the Wi-Fi network, wherein the adjustments reprogram a sniffing pipeline at each of the intrusion detection sensors including adjusting an endpoint device for sending sniffed traffic and dropping more traffic during deep packet inspection, wherein the sniffing pipeline comprises adjusting which of the plurality of access points to serve as sensors for intrusion detection and which of the plurality of access points to serve as conventional access points.

2. The method of claim 1, wherein the sniffing pipeline comprises:

adjusting definition of benign traffic dropped from known sources.

3. The method of claim 1, wherein the sniffing pipeline comprises:

adjusting types of traffic sent upstream in a classification module and a destination for each type of traffic.

4. The method of claim 1, wherein adjusting the amount of sniffed traffic comprises:

adjusting network traffic splicing in a chunking module to forwarding an adjusted portion of individual packets from network traffic, according to the sniffing policy.

5. The method of claim 1, wherein the sniffing pipeline comprises:

adjusting a tuple for sampling network traffic, according to the sniffing policy.

6. A non-transitory computer-readable medium to, when executed by a processor, perform a computer-implemented method in a WIPS (wireless intrusion prevention system) server implemented at least partially in hardware and communicatively coupled to a plurality of access points which are in turn communicatively coupled to a plurality of wireless stations on a Wi-Fi portion of a data communication network, for deploying sniffing policies in embedded access point sensors, the method comprising the steps of:

receiving a plurality of sniffing policies;

detecting a change in network traffic from a traffic monitor;

monitoring a level of sniffed traffic backhauled over the Wi-Fi network for analysis; and responsive to exceeding a certain level of sniffed traffic being backhauled, adjusting an amount of sniffed traffic sent upstream for analysis by reprogramming a plurality of access points serving as intrusion detection sensors to sniff traffic at various locations on the Wi-Fi network, wherein the adjustments reprogram a sniffing pipeline at each of the intrusion detection sensors including adjusting an endpoint device for sending sniffed traffic and dropping more traffic during deep packet inspection, wherein the sniffing pipeline comprises adjusting which of the plurality of access points to serve as sensors for intrusion detection and which of the plurality of access points to serve as conventional access points.

* * * * *